United States Patent [19]

Looney

[11] 4,268,022
[45] May 19, 1981

[54] CONFORMING DOCUMENT ALIGNER

[75] Inventor: John H. Looney, Fairport, N.Y.

[73] Assignee: Xerox Corporation, Stamford, Conn.

[21] Appl. No.: 71,331

[22] Filed: Aug. 30, 1979

[51] Int. Cl.³ .......................... B65H 5/02; B65H 9/04
[52] U.S. Cl. ....................................... 271/7; 271/233;
271/245; 271/225; 271/275
[58] Field of Search ............... 271/275, 245, 246, 247,
271/233, 3, 3.1, 4, 6, 7, 10, DIG. 9, 184, 186,
225; 355/3 SH, 14 SH, 75, 76

[56] References Cited

U.S. PATENT DOCUMENTS

| 3,556,511 | 1/1971 | Howard et al. | 271/4 |
| 3,623,806 | 11/1971 | Short | 355/75 X |
| 3,844,552 | 10/1974 | Bleau et al. | 271/245 |
| 3,845,951 | 11/1974 | Hamaker | 271/243 |
| 3,880,274 | 4/1975 | Bechtloff et al. | 198/847 X |
| 3,910,570 | 10/1975 | Bleau | 271/245 |
| 4,000,943 | 1/1977 | Bar-on | 271/275 X |
| 4,023,791 | 5/1977 | Hori et al. | 271/4 X |
| 4,147,339 | 4/1979 | Shiina | 271/245 X |
| 4,185,908 | 1/1980 | Taylor et al. | 271/275 X |

Primary Examiner—Bruce H. Stoner, Jr.

[57] ABSTRACT

An improved document registration system in a copier having a platen for exposing documents includes a registration edge at the forward end of the platen and at least one foam document aligning belt located adjacent to and above the registration edge. The alignment belt is adapted to extend a short distance over and conform to the registration edge so that documents can be driven toward the registration edge with positive control and thereby reduce up-curl and registration edge jumping.

7 Claims, 4 Drawing Figures

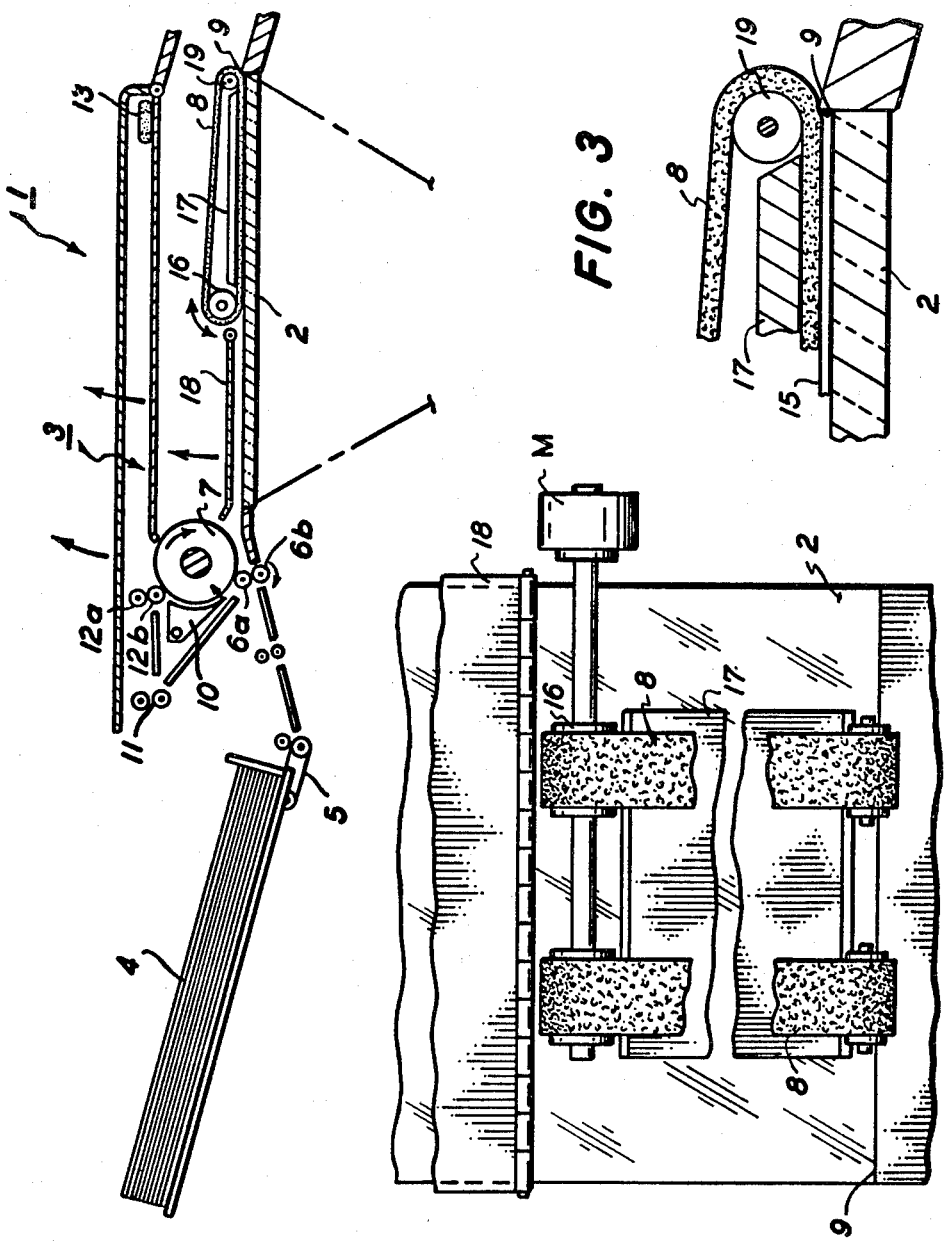

CONFORMING DOCUMENT ALIGNER

The present invention relates to an automatic document handling apparatus having an improved document registration system.

As xerographic and other copiers increase in speed and become more automatic, it is increasingly important to provide higher speed yet more reliable and more automatic handling of both the copy sheets and the individual original documents being copied. The providing of duplex copying capabilities and pre-collation copying capabilities greatly complicates and increases the copier document and copy sheet handling complexities.

While the present invention is not limited thereto, a desirable feature for a copier is to provide automatic document recirculation for pre-collation copying. As discussed, for example, in detail in U.S. Pat. Nos. 3,963,345, issued June 15, 1976 to D. J. Stemmle et al. at columns 1-4, and 4,116,558, issued Sept. 26, 1978 to J. A. Adamek et al., such pre-collation copying systems provide a number of important advantages. The copies exit the copier in pre-collated sets, and do not require subsequent sorting in a sorter or collator. Any desired number of such copy sets may be made by making a corresponding number of recirculations of the document set in collated order past a copying station and copying each document one each time it recirculates. On-line finishing and/or removal of the completed copy sets may be provided while additional copy sets are being made from the same document set.

However, a disadvantage of pre-collation copying systems is that the documents must all be repeatedly circulated, and copied in a predetermined order only one in each circulation, by a number of circulations equivalent to the desired number of copy sets. Thus, it may be seen that increased document handling is necessitated for a pre-collation copying system, as compared to a conventional post-collation copying system. Maximizing document handling automation and copying cycle efficiency is particularly important in pre-collation copying. If the document handler cannot circulate and copy documents in coordination with the copy sheets in the correct order, the total copying time for each copy set will be increased.

In a post-collation copying system, all the desired copies are made at one time from each document page and collated by being placed in separate sorter bins. The document set need only be circulated once and multiply copied to fill bins of the copy sheet sorter or collator with the corresponding number of copy sets desired. However, the number of copy sets which can be made in one circulation is limited by the number of available bins, and the sorter adds space and complexity and is not well suited for on-line finishing.

Some examples of art relating to pre-collation document handling units include, besides art cited above: German Patentschrift No. 1,228,295, Oct. 25, 1962; and U.S. Pat. No. Re. 27,976 (originally U.S. Pat. No. 3,499,710, issued Mar. 10, 1970) to L. W. Sahley; U.S. Pat. Nos. 3,536,320, issued Oct. 27, 1970, to D. R. Derby; 3,552,739, issued Jan. 5, 1971, to R. R. Roberts et al.; 3,556,511, issued Jan. 19, 1971, to A. Howard et al.; 3,888,579, issued June 10, 1975, to V. Rodek et al.; and 3,937,454, issued Feb. 10, 1976, to R. H. Colwill. A recent example of a recirculating pre-collation copying system of this type with circuitry and switches for counting the number of documents recirculated and for counting the completion of each set circulation, is shown in U.S. Pat. No. 4,076,408, issued Feb. 28, 1978, to M. R. Reid et al.

As to some examples of further art of particular interest relating to specific features of this disclosure, U.S. Pat. No. 3,790,158, issued Feb. 5, 1974, to J. E. Summers et al., and several of the above patents disclosed recirculating documents to and from a stack at one side of a platen to a fixed registration edge with a reversible platen belt. A document platen belt which is deformed adjacent platen registration fingers is disclosed in U.S. Pat. No. 3,910,570, issued Oct. 7, 1975, to C. D. Bleau. Multiple platen belts are disclosed in U.S. Pat. No. 3,844,552, issued Oct. 29, 1974, to C. D. Bleau et al. A stationary spaced over-platen plate with a small area document ejection drive is disclosed in U.S. Pat. No. 3,888,581, issued June 10, 1975, to J. R. Caldwell. A sheet reversing chute system of the type disclosed herein is disclosed in U.S. Pat. No. 3,856,295, issued Dec. 24, 1974, to the subject inventor.

Examples of copier systems with general document and sheet handling control systems are described in U.S. Pat. Nos. 4,062,061, issued Dec. 6, 1977, to P. J. Batchelor et al.; 4,078,787, issued Mar. 14, 1978, to L. E. Burlew et al.; 4,099,150, issued July 4, 1978, to J. L. Conin; 4,123,155, issued Oct. 31, 1978, to W. L. Hubert; 4,125,325, issued Nov. 14, 1978, to P. J. Batchelor et al.; and 4,144,550, issued Mar. 13, 1979, to J. M. Donohue et al.

Conventional integral software incorporation into the copier's general microprocessor logic circuitry and software of the functions and logic defined herein as taught by various of the above-cited patents is preferred. However, it will be appreciated that the functions and systems disclosed herein may be alternatively conventionally incorporated into a copier utilizing any other suitable or known copier software or hard wired logic systems, cambank switch controllers, etc. The output control of the exemplary sheet handling systems disclosed herein may be accomplished by activating known electrical solenoid controlled sheet deflector fingers and drive motors or their clutches in the indicated sequences, and conventional sheet path sensors or switches may be utilized for counting and keeping track of the positions of documents and copy sheets.

All of the patents cited herein for background or art purposes are also incorporated by reference herein to the extent they provide teachings of usable or alternative systems or hardware for the disclosed embodiments herein.

Some document handlers, as for example, U.S. Pat. No. 4,000,943, issued to Ari Bar-On on Jan. 4, 1977, employ a wide white friction belt, or alternatively, a multiplicity of narrow belts, as platen transports for documents. Each has its own advantages and disadvantages. A wide white belt produces no show-around on copies, yet typically has a pocket near a fixed registration edge which can allow lead edge up-curl or buckling of the document. The multiple belt transport can hold the document flat at the registration edge since the belts can be interleaved with the edge, but this allows belt show-around on copies, especially in the reduction mode, especially as the multiple belt edges tend to become contaminated and darkened. The multiple belts can be skewed for corner registration, if desired, as disclosed in U.S. Pat. No. 4,147,339, issued Apr. 3, 1979, and assigned to Ricoh Company, Ltd.

A preferred embodiment of the present invention is intended to overcome the above disadvantages by providing positive lead edge control of documents and includes in a copier having a platen for exposing documents thereon, the improvement of a document registration system, comprising a registration edge at the forward end of the platen, and a plurality of foam document aligning belts located adjacent to and above the registration edge, said alignment belts being adapted to extend a short distance over and conform to said registration edge whereby documents are engaged by said belts and driven toward said registration edge with minimum friction and reduced impact in order to minimize document up-curl and registration edge jumping.

Further features and advantages of the invention will be better understood by reference to the following description, and to the drawings forming a part thereof, wherein:

FIG. 1 is a side view of an exemplary document handling unit incorporating the registration system of the present invention mounted over a copier platen;

FIG. 2 is a partial top view of the document handling unit of FIG. 1;

FIG. 3 is an enlarged portion of FIG. 1 illustrating the disclosed document registration system.

Figure 4:
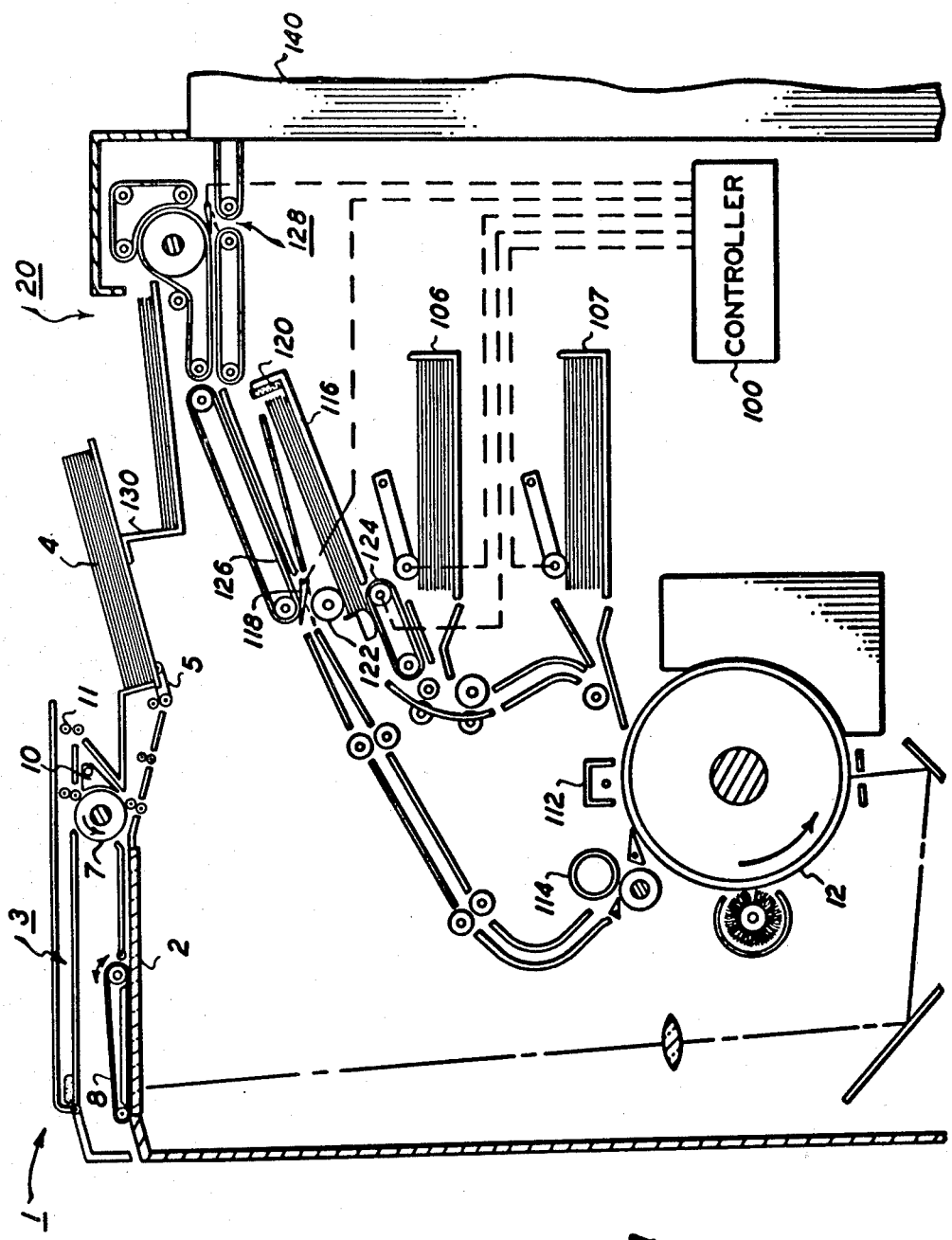
FIG. 4 shows the document handling unit of FIG. 1 on an exemplary duplex xerographic copier.

Referring to the exemplary automatic document feeding unit 1 shown in FIGS. 1-4, it will be appreciated that various document feeders and copiers may be utilized with the present invention other than those disclosed herein, including various ones disclosed in the above-cited references.

In the recirculating document handler (RDH) 1 here, individual original documents are sequentially fed from the bottom of the stack of documents 4 (placed by the operator face-down in the document storage area or stacking tray) directly to the imaging station, which is the conventional platen 2 of the copier, to be conventionally imaged onto a photoreceptor for the making of copies in a conventional xerographic manner. The documents are thus circulated in 1 to N order, i.e., first to last or forward serial order, for simplified copy duplexing and job recovery. The document handler 1 has conventional switches for sensing and counting the individual documents fed from the stack 4, i.e., counting the number of document sheets circulated. A conventional resettable bail and its associated switch will be provided on the stack 4 to indicate the completion of each circulation of the complete document set and be automatically reset on the top of the stack before the next circulation. The document sheets may be conventional sizes and weights of sheets of paper or plastic containing information indicia to be copied, e.g., printed or typed letters, drawings, prints, photographs, etc. A bottom feeder 5 feeds the bottom document sheet, on demand, to a platen sheet feeder 6a and 6b and 7 which moves the document onto and off of the copier platen. With this document feeder unit 1, the documents are not inverted as they are fed from the tray to the imaging station.

side of the platen 2. Each document is fed onto the platen here by an input roller pair 6a and 6b, which may be directly driven by engagement of the roller 6a by a large roller 7 driven in the arrow direction as shown. The registration of the document on the platen is accomplished on the platen here by the belts 8 and a fixed raised registration edge 9. (Note FIGS. 2 and 3). Reversal of the registration belts 8 by motor M after copying drives the document back toward the nip between the roller 6a and the roller 7, which transports the document into a diverter gate 10.

If the lip of the gate 10 is moved up, as shown by the movement arrow thereon, it will deflect the document directly into the nip of the return roller pair 11, which will return the document directly to the top of the stack 4, so that the documents may be recirculated in maintained collated order without inversion. Thus, in this mode of operation, utilized for simplex documents, the document inverter 3 is not utilized.

For duplex documents the inverting gate 10 is held down, so as to deflect the documents being returned from the platen around the outside of the roller 7 and into the nip between the roller 7 and a roller 12b, which may be driven by its engagement therewith. The document, now inverted, is driven into the pocket or chute of the document inverter 3, until it strikes a resilient reversing pad 13 of a known type at the end thereof, which bounces the document back into the nip between the rollers 12a and 12b, which drive the document into the same return roller pair 11 of restacking on the stack 4 in inverted orientation compared to its original orientation in the stack, (but in the same collated document order).

Note that the document inverter 3 here is a compact "Y" configuration with an inverting chute which is parallel to and closely spaced above the platen, so as to reduce the size of the RDH unit 1. The chute may be the same size as the platen since it is overlying the platen. It may be hinged as shown to pivot up away from the platen 2 for jam clearance or other desired platen access. It is preferably also semi-transparent.

The entire RDH 1 may be a compact lightweight unit which may be pivotally or otherwise removed from the platen 2 to allow alternative manual copying, yet can provide continuous document recirculation for pre-collation copying. With this RDH 1 the first document page in the stack 4 may be copied immediately in every circulation, and the entire document recirculation path is very short, thus desirably reducing the movement velocity of the documents needed to keep up with the copying rate of the copier. The simplex document path is shorter than the duplex path, which is preferable, since that is the more commonly used mode. Clear and simple document loading and jam clearance access is provided.

To restate the above, after the document sheet has been copied, there is a decision gate 10 in the document path adjacent the downstream end of the plate comprising pivotable deflector fingers, which determines the

[text partially obscured] ory movement of the documents one of two different return transport ocument stack 4. These two paths are ansport path and a second (duplex) e first or simplex transport path res to the same restacking tray without e second or duplex transport path and returns the documents for re- a single inversion. Therefore, the tration and document aligning system requires feeding the documents from one side of the platen with a separate feeder and releasing their edge areas and subsequently recapturing the lead edges of the documents with short belts 9.

Further disclosed herein is at least one compressible foam document aligning belt adjacent to and above the registration edge that is adapted to extend a short distance over and conform to the registration edge so that solenoid or other actuation of the selector gate 10 determines whether the documents are recirculated with a total of none or one inversions. With no inversions (the simplex path) the same sides of the documents are exposed in each circulation and are restacked in the tray in each circulation in their original orientation. With one inversion (the duplex path) the documents are restacked in the tray inverted from their previous orientation, which provides for copying of the opposite sides or faces of the documents on their next circulation, i.e., for copying duplex documents. The duplex path transport here comprises the disclosed three roller (7, 12a, 12b) sheet inverter and the over-platen reversing chute 3.

Both the simplex transport path and duplex transport path continuously and rapidly restack the sheets after they are copied on the top of the stack 4 of the sheets in the document tray without interferring with simultaneous bottom feeding. Thus, continuous multiple recirculations for pre-collation copying can be provided.

Immediate duplex is possible with this RDH by reversing rollers 7 and 11 just as the trail edge of the document is coming out of the inverter through rollers 11 to feed the same sheet immediately back to the platen 2 to copy its second side before it returns to the stack 4. This can be used for non-precollation duplex/duplex. The multiple copies of one face are stored in a duplex tray and fed out for the second face copying and into a sorter.

In accordance with the present invention and in further reference to FIGS. 1–4, a multiple belt transport and registration system for documents is shown that comprises a registration edge 9 located at the forward end of platen 2. Multiple belts 8, instead of spanning the entire platen, engage documents 15 after they have been fed onto the platen from stack 4 by input roller pair 6a and 6b. The multiple belt transport is positioned within the smallest document imaging area and thus provides no show-around on copies reproduced therefrom. A pivotable white backing plate or platen cover 18 which covers between approximately one third and two thirds of the platen area is stationary during copying cycles, and produces no border defects either in a reduction mode or in the case of a slight misregistration of originals. If desired, the backing plate could extend to registration edge 9 with appropriate cut outs for the belts.

Short drive belts 8 of elastomer foam, driven by reversible rollers 16, transport the documents against registration edge 9 with a very low friction drive while working in combination with presser shoe 17. The belts 8 extend from over the registration edge 9 a short distance toward the document input area. They present a very small containment space for the documents so that up-curl and registration edge jumping is minimized. By butting the foam drive member into the registration edge, document edge load is substantially reduced. Short belts also apply a minimum amount of friction to the documents as well as a minimum load on the paper or other substrate and the platen, thus reducing the likelihood of scratching the platen. A further advantage of the present invention is that the partial-length platen belts, by use of reversible rollers 16, more quickly release one document to allow its return while another document comes in through rollers 6a and 6b to be fed against fixed registration edge 9, thus reducing inter-pitch distance between documents on the copier photoreceptor and thereby allowing more copies to be made in a shorter period of time.

As an alternative, movable or fixed registration fingers that extend up between the belts could replace registration edge 9 for more positive registration. Belts 8 would then be more positively interleaved with the registration fingers with documents being held flat by the belts 8 and presser member 17. With retractable registration fingers, downstream straight through document egress rather than reversible document ejection could be provided and kicker rolls could be used to ensure that the documents exit the platen area on time. That is, the registration fingers could be solenoid controlled and adapted to retract for document egress to an output tray located to the right of the registration fingers. An additional feature with short belts 8 is that since the belts are never imaged, they need not be cleaned for purely cosmetic reasons. They may not even need to be white.

In reference to FIG. 3, presser shoe 17 in conjunction with idler rollers 19 are adapted to compress the compressible foraminous belts 8 over the raised registration edge 9 and allows the foraminous belts to expand downwardly below the top of the registration edge to push down the lead edge of a document adjacent the registration edge to improve reliability of stopping the document at the registration edge more positively while at the same time preventing the document from jumping over the registration edge.

Referring to FIG. 4, an exemplary copier 20 processor and its controller 100 will now be described. This copier system is disclosed in more detail in U.S. Pat. No. 4,166,614 and German OLS No. 2,828,669. It provides duplex or simplex pre-collated copy sets from either duplex or simplex original documents copied from the RDH 1. Two separate copy sheet trays 106 and 107 are provided here to feed clean copy sheets onto which the images of the documents are to be printed. The control of sheet feeding is by the machine controller 100. The controller 100 is preferably of the known programmable microprocessor type exemplified by the patents cited in the introduction, which conventionally also controls all of the other machine functions described herein including the operation of the document feeder, the document and copy sheet gates, feeder drives, etc.

The copy sheets are fed from trays 106 or 107 to the conventional xerographic transfer station 112 for imaging one side thereof, then to the conventional fusing station 114. From there, depending on the position of a duplex selector finger or gate 118, the copy sheets will be deflected either into a duplex buffer intermediate storage tray 116 for duplex copies, or into the copy output path of the copier via an output transport 126. The copy sheets stacked into the duplex tray 116 are stacked image face-up in the order in which they are copied. The duplex tray 116 here includes a bounce reverser 120 and jogger/normal force wheels 122 for assisting the stacking of copy sheets therein and assistance in bottom feeding from the duplex tray 116 by a bottom feeder 124. For duplex copying the previously simplexed copy sheets in the tray 116 are fed by the feeder 124 back to the transfer station 112 for the imaging of their second or opposite side page image. Such now-duplexed copy sheets are then fed out past the now-opened gate 118 into the same output transport 126.

The output transport 126 transport the finished copy sheets to an output tray 130 through a gate 128 and inverter as shown, or, preferably, to a finishing station 140 for the stapling, stitching, gluing, binding, and/or off-set stacking of the completed, pre-collated, copy sets. The copy sheets may be stacked in an output tray or in the finisher in a compiler tray in the order produced, without inversion for simplex copies, or with an inverter or inversion in the output path for duplex copies, in this 1 to N system, in which the odd page side is the second side imaged and the copies are inverted inherently by the processor before the output.

As disclosed in the cited U.S. Pat. No. 4,116,558, preferably for simplex/duplex copying only the even page documents are copied in the first document circulation by copying every other document sheet starting with the second document sheet. The odd document pages are circulated, but not copied in this first circulation. Thus, an even side buffer set is preferably always placed in the duplex tray. After the first document circulation, all by the last subsequent circulations proceed with copying of all simplex document pages in each circulation onto copy sheets fed alternately from the copy tray and duplex tray. Then on the last document set circulation only the odd document pages are copied.

Referring now to the duplex/duplex system which can be compatibly provided here, the duplex documents may also be loaded face-down and copied in the same 1 to N (forward serial) order from the same single document tray. Here the document inverter for the duplex documents is downstream of the platen rather than upstream. Thus, the duplex documents may be first run through a single dummy (non-copying) circulation with inversion to restack the documents inverted in the DH tray from their initial orientation. Thus, the even sides of the duplex documents may be copied on the second (first copying) circulation. On all subsequent circulation (up to the final one) every duplex document sheet is copied on one side and then inverted before restacking as described in U.S. Pat. No. 4,166,614, and OLS 2,828,669. That is, all the even document page sides may be copied on one circulation and placed in the duplex tray, then all the odd sides copied in the next circulation onto the opposite sides of that buffer set fed from the duplex tray, etc. The duplex documents are inverted during all but the last circulation. On the last duplex document copying pass the documents are all copied but are not inverted. Therefore, they are automatically re-collated in the document handler tray during this last copying circulation.

The disclosed document handling unit is particularly suitable for alternatively or additionally providing a non-pre-collation copying mode in which multiple copies are made from the documents and they are not recirculated. The documents can be placed in the same manner (face-down) in a stack, or manually fed one at a time face-down like a semi-automatic document handler. That is, the same, logical, document placement is provided for all copying modes.

As can be seen from the description above, there is disclosed herein a plurality of spaced apart document transporting and aligning belts which extend across only a portion of the platen to and beyond the registration edge. That is, documents which have been fed onto the platen are subsequently engaged by the belts and driven towards and registered against the registration edge with the belts being shorter than the platen and shorter than the smallest document being copied on the platen so as to be fully underlaid by the document being copied to avoid show-around exposure of the belts. It would be understood that a single short belt could replace the multiple document belts if desired.

With either a single or multiple belt registration system, the prior art and obvious approach would be to run the belt or belts completely across the platen to positively feed the document. In contrast, the present registration and document aligning system requires feeding the documents from one side of the platen with a separate feeder and releasing their edge areas and subsequently recapturing the lead edges of the documents with short belts 9.

Further disclosed herein is at least one compressible foam document aligning belt adjacent to and above the registration edge that is adapted to extend a short distance over and conform to the registration edge so that documents that are driven by the belt towards the registration edge are transported with a minimum of friction and engage the registration edge before imaging with no appreciable impact.

In addition to the method and apparatus disclosed above, other modifications and/or additions will readily appear to those skilled in the art upon reading this disclosure and these are intended to be encompassed within the invention disclosed and claimed herein.

What is claimed is:

1. In a copier having a platen for exposing documents thereon, the improvement of a document registration system, comprising:
   a raised registration edge at the forward end of the platen; and
   at least one compressible foam document aligning belt located adjacent to and above said registration edge, said alignment belt extending a short distance over said platen and conforming to said registration edge such that the documents engaged by said belt are pulled toward said registration edge with minimum friction and reduced registration edge impact, and means to compress said compressible foam belt over said raised registration edge allowing said belt to expand downwardly below the top of said edge to push down the lead edge of a document adjacent said registration edge in order to control document up-curl and registration edge jumping.

2. The improvement of claim 1 wherein said belt is adapted to feed documents onto the platen and remove the documents after exposure from the platen.

3. The improvement of claims 1 or 2 wherein said registration edge comprises fingers that extend perpendicular to the path of movement of the documents.

4. The improvement of claim 2 wherein said belt is adapted to remove the documents from said platen by movement in a reverse direction.

5. A method of locating documents on a platen while simultaneously reducing document up-curl, comprising the steps of:
   providing a raised registration edge against which the documents are to be located;
   providing at least one compressible foam document aligning belt that pulls documents onto the platen adjacent to and above said registration edge, said alignment belt extending across a portion of said platen that is substantially less than one dimension of said platen; and
   compressing the compressible belt over the raised registration edge and allowing said belt to expand below the top of said registration edge to push down the lead edge of a sheet adjacent the registration edge to improve the reliability of stopping the sheet at the registration edge.

6. The method of claim 5 including the step of:
   providing presser shoe means located interiorly of said belt and adapted to apply positive control pressure to documents being directed toward said registration edge.

7. The method of claims 5 or 6 wherein said belt comprises a foraminous material.

* * * * *